(12) United States Patent
Nambara

(10) Patent No.: US 11,474,349 B2
(45) Date of Patent: Oct. 18, 2022

(54) HEAD-UP DISPLAY DEVICE

(71) Applicant: DENSO CORPORATION, Kariya (JP)

(72) Inventor: Takahiro Nambara, Kariya (JP)

(73) Assignee: DENSO CORPORATION, Kariya (JP)

( * ) Notice: Subject to any disclaimer, the term of this patent is extended or adjusted under 35 U.S.C. 154(b) by 784 days.

(21) Appl. No.: 16/356,405

(22) Filed: Mar. 18, 2019

(65) Prior Publication Data

US 2020/0026073 A1 Jan. 23, 2020

Related U.S. Application Data

(63) Continuation of application No. PCT/JP2017/033181, filed on Sep. 14, 2017.

(30) Foreign Application Priority Data

Sep. 22, 2016 (JP) .............................. JP2016-184951

(51) Int. Cl.
*G02B 27/01* (2006.01)
*G02B 27/28* (2006.01)
(Continued)

(52) U.S. Cl.
CPC ....... *G02B 27/0101* (2013.01); *G02B 5/0816* (2013.01); *G02B 27/286* (2013.01);
(Continued)

(58) Field of Classification Search
CPC .. G02B 5/3083; G02B 5/3025; G02B 27/283; G02B 27/286; G02B 5/3016;
(Continued)

(56) References Cited

U.S. PATENT DOCUMENTS 5,903,395 A 5/1999 Rallison et al.
6,097,543 A 8/2000 Rallison et al.
(Continued)

FOREIGN PATENT DOCUMENTS

CN 1269892 A * 10/2000 ............ G03B 21/10
EP 3118667 A1 1/2017
(Continued)

*Primary Examiner* — Collin X Beatty
*Assistant Examiner* — Grant A Gagnon
(74) *Attorney, Agent, or Firm* — Harness, Dickey & Pierce, P.L.C.

(57) ABSTRACT

A light guide unit includes a first phase shifter disposed on the optical path to convert the display light as the linear polarized light from the projection unit into a circularly polarized light and including a reflection surface directed to the projection member and capable of reflecting a light from the projection member side to the projection member, a second phase shifter disposed on the projection member side of the first phase shifter on the optical path and giving a ¼ wavelength phase difference to the display light converted into the circularly polarized light by the first phase shifter to convert the display light into a linear polarized light, and a linear polarizer on the projection member side of the second phase shifter on the optical path. The linear polarizer guides the display light converted into the linear polarized light by the second phase shifter toward the projection member.

7 Claims, 4 Drawing Sheets

(51) Int. Cl.
*G03B 21/28* (2006.01)
*G02B 5/08* (2006.01)
*G03B 21/00* (2006.01)
*B60K 35/00* (2006.01)

(52) U.S. Cl.
CPC .......... *G03B 21/006* (2013.01); *G03B 21/28* (2013.01); *B60K 35/00* (2013.01); *B60K 2370/1529* (2019.05); *B60K 2370/167* (2019.05); *B60K 2370/25* (2019.05); *G02B 2027/0118* (2013.01)

(58) Field of Classification Search
CPC ...... G02B 27/28; G02B 30/25; G02B 5/3058; G02B 27/281; G02B 1/08; G02B 5/305; G02B 5/23; G02B 5/3033; G02B 26/02; G02B 27/285; G02B 5/0841; G02B 5/3041; G02B 1/02; G02B 1/04; G02B 27/145; G02B 27/288; G02B 27/0093; G02B 6/0055; G02B 6/0056; G02B 6/4246; G02B 26/001; G02B 27/149; G02B 5/1809; G02B 5/3066; G02B 5/3075; G02B 1/06; G02B 5/30; G02B 6/0046; G02B 6/005; G02B 6/0096; G02B 6/272; G02B 1/10; G02B 1/11; G02B 21/0092; G02B 27/0927; G02B 27/1046; G02B 27/1073; G02B 27/144; G02B 27/48; G02B 5/04; G02B 5/0883; G02B 5/26; G02B 5/32; G02B 6/2746; G02B 6/2766; G02B 6/32; G02B 6/34; G02B 6/4208; G02B 6/4214; G02B 1/14; G02B 13/143; G02B 21/0068; G02B 26/105; G02B 27/0101; G02B 27/1006; G02B 30/27; G02B 30/56; G02B 5/00; G02B 6/105; G02B 6/274; G02B 6/2937; G02B 6/2938; G02B 6/305; G02B 6/4206; G02B 6/43; G02B 1/115; G02B 13/24; G02B 17/0892; G02B 19/0028; G02B 2027/012; G02B 21/0016; G02B 26/10; G02B 27/0025; G02B 27/022; G02B 27/095; G02B 27/0977; G02B 27/1053; G02B 27/106; G02B 27/108; G02B 27/142; G02B 27/143; G02B 27/642; G02B 3/0056; G02B 5/008; G02B 5/0278; G02B 5/201; G02B 5/3008; G02B 6/12007; G02B 6/126; G02B 6/2713; G02B 6/2773; G02B 6/2848; G02B 6/29302; G02B 6/29311; G02B 6/29362; G02B 6/29395; G02B 6/327; G02B 7/008; G02B 7/182; G02B 1/005; G02B 1/041; G02B 1/12; G02B 13/001; G02B 13/0045; G02B 13/16; G02B 17/00; G02B 17/061; G02B 17/08; G02B 19/0019; G02B 19/0033; G02B 19/0061; G02B 2006/0098; G02B 2006/12097; G02B 2006/12107; G02B 2006/12147; G02B 2006/12152; G02B 2027/0114; G02B 2027/0125; G02B 2027/1032; G02B 2027/0136; G02B 2027/0178; G02B 207/0194; G02B 21/0004; G02B 21/002; G02B 21/0032; G02B 21/0044; G02B 21/0048; G02B 21/0056; G02B 21/06; G02B 21/125; G02B 21/14; G02B 2207/117; G02B 23/12; G02B 26/00; G02B 26/008; G02B 26/0825; G02B 26/0833; G02B 26/101; G02B 26/12; G02B 26/123; G02B 26/124; G02B 27/0018; G02B 27/0081; G02B 27/0172; G02B 27/02; G02B 27/026; G02B 27/09; G02B 27/0944; G02B 27/0961; G02B 27/0988; G02B 27/0994; G02B 27/1026; G02B 27/1033; G02B 27/1093; G02B 27/123; G02B 27/141; G02B 27/148; G02B 27/18; G02B 27/42; G02B 27/4233; G02B 27/46; G02B 27/60; G02B 3/0012; G02B 3/0043; G02B 3/0062; G02B 3/0087; G02B 3/08; G02B 3/10; G02B 30/26; G02B 30/30; G02B 30/34; G02B 5/003; G02B 5/02; G02B 5/0215; G02B 5/0236; G02B 5/0252; G02B 5/0257; G02B 5/0263; G02B 5/0294; G02B 5/08; G02B 5/124; G02B 5/18; G02B 5/1814; G02B 5/1819; G02B 5/1857; G02B 5/1866; G02B 5/20; G02B 5/28; G02B 5/284; G02B 5/285; G02B 5/287; G02B 5/288; G02B 5/3091; G02B 6/00; G02B 6/0008; G02B 6/0018; G02B 6/0028; G02B 6/003; G02B 6/0038; G02B 6/0051; G02B 6/0053; G02B 6/12011; G02B 6/12014; G02B 6/12023; G02B 6/122; G02B 6/124; G02B 6/14; G02B 6/264; G02B 6/266; G02B 6/2726; G02B 6/276; G02B 6/278; G02B 6/2786; G02B 6/2813; G02B 6/29317; G02B 6/2934; G02B 6/29358; G02B 6/29361; G02B 6/29386; G02B 6/29392; G02B 6/3552; G02B 6/356; G02B 6/3592; G02B 6/3594; G02B 6/3833; G02B 6/42; G02B 6/4204; G02B 9/34; G03B 21/2073; G03B 33/12; G03B 35/26; G03B 21/14; G03B 21/006; G03B 21/132; G03B 21/208; G03B 21/604; G03B 21/62; G03B 21/206; G03B 21/56; G03B 21/60; G03B 27/72; G03B 33/06; G03B 13/02; G03B 15/10; G03B 17/00; G03B 21/00; G03B 21/005; G03B 21/145; G03B 21/2066; G03B 21/625; G03B 21/64; G03B 2213/025; G03B 27/52; G03B 27/54; G03B 3/02; G03B 25/00; G03B 27/00; G03B 30/00
USPC ........................................................ 359/489
See application file for complete search history.

(56) References Cited

U.S. PATENT DOCUMENTS

| | | |
|---|---|---|
| 6,160,666 A | 12/2000 | Rallison et al. |
| 2015/0123879 A1 | 5/2015 | Aboshi |
| 2017/0045738 A1 | 2/2017 | Kim et al. |
| 2017/0269428 A1 | 9/2017 | Otani et al. |
| 2018/0164585 A1 | 6/2018 | Nambara et al. |
| 2019/0041738 A1* | 2/2019 | Kashiwagi ......... G03B 21/2073 |

FOREIGN PATENT DOCUMENTS

| | | |
|---|---|---|
| JP | H06000885 U | 1/1994 |
| JP | 2008132005 A | 6/2008 |
| JP | 2014026245 A | 2/2014 |
| JP | 2015222337 A | 12/2015 |
| WO | WO-1995021391 A1 | 8/1995 |

* cited by examiner

HEAD-UP DISPLAY DEVICE

CROSS REFERENCE TO RELATED APPLICATIONS

The present application is a continuation application of International Patent Application No. PCT/JP2017/033181 filed on Sep. 14, 2017, which designated the United States and claims the benefit of priority from Japanese Patent Application No. 2016-184951 filed on Sep. 22, 2016. The entire disclosures of all of the above applications are incorporated herein by reference.

TECHNICAL FIELD

The present disclosure relates to a head-up display device (hereinafter referred to as an HUD device) that is mounted on a moving object and displays a virtual image visually recognizable by an occupant.

BACKGROUND ART

Heretofore, there has been known an HUD device which is mounted on a moving object and displays a virtual image visually recognizable by an occupant. For example, the conventional HUD device includes a projection unit and a light guide unit. The projection unit projects a display light of an image as a linear polarized light. The light guide unit provides an optical path for guiding the display light to a projection member.

SUMMARY

The present disclosure provides a head-up display device mounted on a moving object for projecting an image onto a projection member to display the image as a virtual image visually recognizable by an occupant. The head-up display device includes a projection unit that projects a display light of the image as a linear polarized light, and a light guide unit that provides an optical path through which to guide the display light to the projection member. The light guide unit includes a first phase shifter that is disposed on the optical path to convert the display light as the linear polarized light from the projection unit into a circularly polarized light and that includes a reflection surface, which is provided to be directed to the projection member and to be capable of reflecting a light from the projection member side to the projection member side, a second phase shifter that is disposed on the projection member side of the first phase shifter on the optical path and gives a phase difference of a ¼ wavelength to the display light converted into the circularly polarized light by the first phase shifter to convert the display light into a linear polarized light, and a linear polarizer that is disposed on the projection member side of the second phase shifter on the optical path to guide a light whose polarization direction is along a light guide axis and to shield a light whose polarization direction is along a light shield axis perpendicular to the light guide axis. The linear polarizer is provided to arrange the light guide axis along a polarization direction of the display light converted into the linear polarized light by the second phase shifter to guide the display light toward the projection member.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
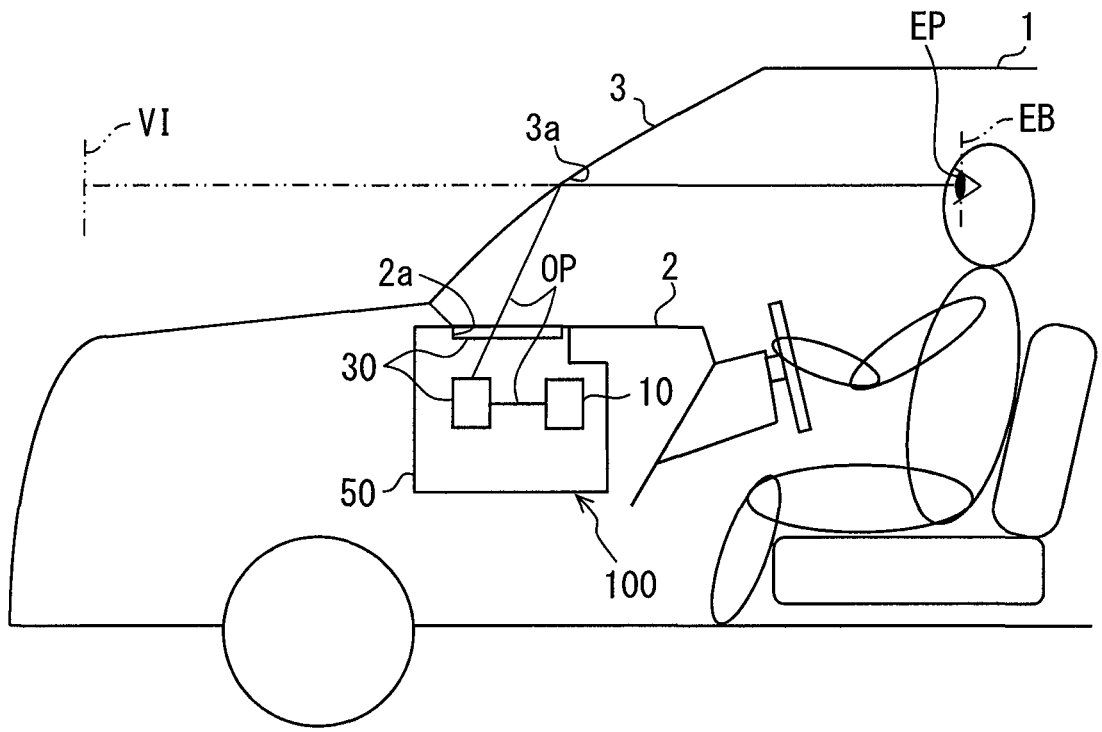
FIG. 1 is a diagram showing a state in which an HUD device is mounted on a vehicle according to a first embodiment.

Hereinafter, multiple embodiments will be described with reference to the drawings. It should be noted that the same reference numerals are assigned to the corresponding components in the respective embodiments, so that overlapping descriptions may be omitted. When only a part of the configuration is described in each embodiment, the configuration of the other embodiments described above can be applied to other parts of the configuration. Further, not only the combinations of the configurations explicitly shown in the description of the respective embodiments, but also the configurations of the plurality of embodiments can be partially combined even if they are not explicitly shown if there is no problem in the combinations in particular.

First Embodiment

As shown in FIG. 1, an HUD device 100 according to a first embodiment is mounted on a vehicle 1, which is one type of a moving object, and is accommodated in an instrument panel 2. The HUD device 100 projects an image onto a windshield 3 as a projection member of the vehicle 1. As a result, the HUD device 100 displays an image as a virtual image so that the image can be visually recognized by an occupant. In other words, when a display light of the image reflected by the windshield 3 reaches a viewing area EB set in an interior of the vehicle 1, the occupant whose eye point EP is located in the visual recognition region EB perceives the display light as a virtual image VI. The occupant can recognize various types of information displayed as a virtual image VI. The various types of information displayed as the virtual image VI include, for example, vehicle state values such as a vehicle speed and a remaining fuel level, and vehicle information such as road information and visibility auxiliary information.

The windshield 3 of the vehicle 1 is formed of a light transmissive glass or a synthetic resin in a plate shape. The windshield 3 has a projection surface 3a on which a display light is projected formed in a smooth concave or planar shape. As the projection member, a combiner which is separate from the vehicle 1 may be installed in the vehicle 1 and an image may be projected onto the combiner. The HUD device 100 per se may include a combiner as the projection member.

The visual recognition region EB is a spatial region in which the virtual image VI displayed by the HUD device 100 can be visually recognized. Typically, the visual recognition region EB is provided so as to overlap with an eyelips set in the vehicle 1. The eyelips is set based on an eye range that statistically represents distributions of the eye points EP of drivers as the occupants (in detail, refer to JISD0021: 1998).

A specific configuration of the HUD device 100 will be described below. The HUD device 100 includes a projection unit 10 and a light guide unit 30. The projection unit 10 and the light guide unit 30 are accommodated in a housing 50 of the HUD device 100.

Figure 2:
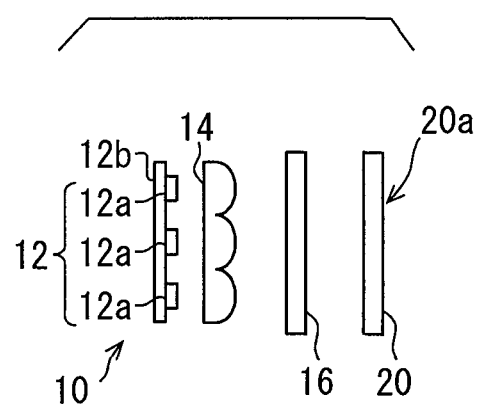
FIG. 2 is a diagram showing a projection unit according to the first embodiment.

As shown in FIG. 2, the projection unit 10 includes a light source 12, a condenser lens 14, a field lens 16, and a liquid crystal panel 20, and is formed by accommodating them in a box-shaped casing, for example.

The light source 12 is configured by, for example, an array of multiple light emitting devices 12a. The light emitting devices 12a according to the present embodiment are light emitting diode devices that are disposed on a light source circuit board 12b and connected to a power supply. Each of the light emitting devices 12a emits a light with a light emission amount corresponding to a current amount by energization. More specifically, in each light emitting devices 12a, for example, a blue light emitting diode is covered with a phosphor, to thereby realize a light emission in a pseudo white color. In the present embodiment, three light emitting devices 12a are provided.

The condenser lens 14 and the field lens 16 are disposed between the light source 12 and the liquid crystal panel 20. The condenser lens 14 is made of, for example, synthetic resin or glass and has a light transmissive property. In particular, the condenser lens 14 according to the present embodiment is a lens array in which multiple convex lens elements 14a are arrayed in accordance with the number and placement of the light emitting devices 12a. The condenser lens 14 condenses the light incident from the light source side and ejects the condensed light to the field lens 16 side.

The field lens 16 is disposed between the condenser lens 14 and the liquid crystal panel 20, and is made of, for example, synthetic resin or glass to have a light transmissive property. In particular, the field lens 16 of the present embodiment is a Fresnel lens formed in a plate-like shape. The field lens 16 further condenses the light incident from the condenser lens 14 side and emits the condensed light toward the liquid crystal panel 20 side.

Figure 3:
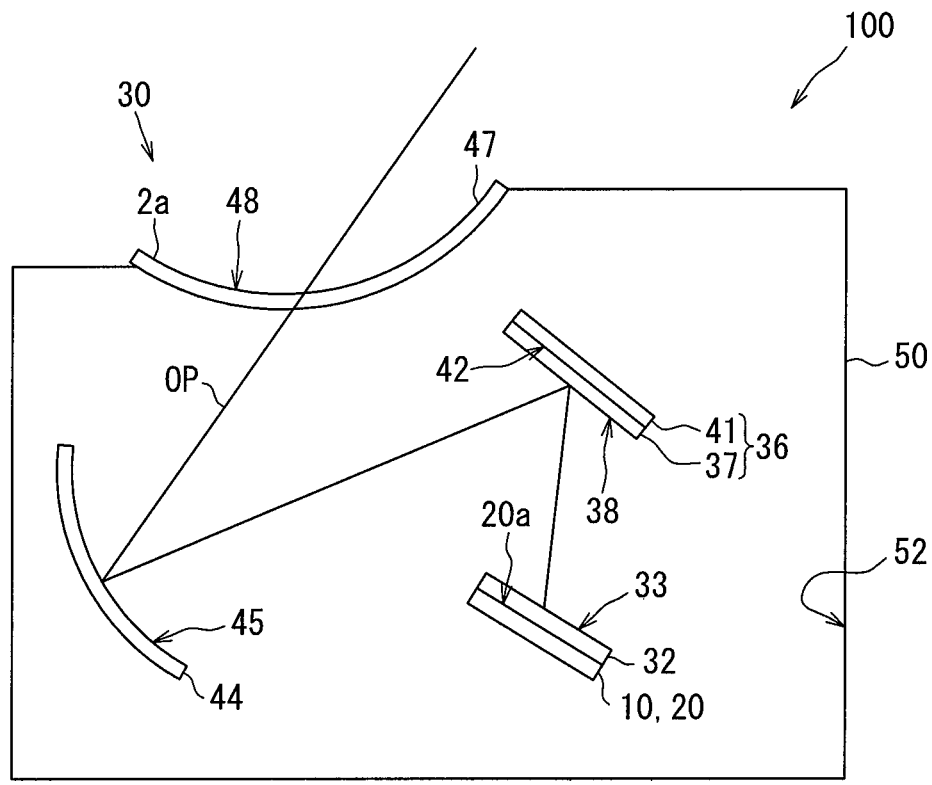
FIG. 3 is a diagram showing a schematic configuration of the HUD device according to the first embodiment.

As shown in FIGS. 2 and 3, the liquid crystal panel 20 according to the present embodiment is a liquid crystal panel using thin film transistors (TFTs), and is an active matrix type liquid crystal panel formed of multiple liquid crystal pixels arrayed in two directions, for example. In the liquid crystal panel 20, a pair of linearly polarizing plates, a liquid crystal layer sandwiched between the pair of linearly polarizing plates, and the like are stacked on each other. Each of the linearly polarizing plates has a property that guides the light whose polarization direction is along the light guide axis and shields the light whose polarization direction is along the light shield axis. The pair of linearly polarizing plates are disposed so that the light guide axes of the linearly polarizing plates are substantially orthogonal to each other. The liquid crystal layer can rotate the polarization direction of the light incident on the liquid crystal layer in accordance with an applied voltage by applying a voltage for each liquid crystal pixel.

The liquid crystal panel 20 can form an image by the display light emitted from the display surface 20a by controlling a transmittance of the light for each liquid crystal pixel by the incident light from the condenser lens 14 side. Adjacent liquid crystal pixels are provided with color filters of different colors (for example, red, green, and blue), and various colors are realized in combinations of those color filters. In this example, the display light is emitted from the display surface 20a as the linear polarized light having a polarization direction along the light guide axis 21a (refer to also FIG. 4) of the light guide axis 21a and the light shield axis 21b of the linearly polarizing plate 21 on the display surface 20a side.

With the liquid crystal panel 20 described above, the projection unit 10 projects the display light of an image as the linear polarized light. As shown in FIG. 3, the display light projected by the projection unit 10 is guided to the windshield 3 through an optical path OP provided by the light guide unit 30. The light guide unit 30 includes a first phase shifter 32, a reflecting member 36, a magnifying mirror 44, and a linear polarizer 47.

The first phase sifter 32 is disposed on the optical path OP. Specifically, the first phase shifter 32 is a ¼ wavelength plate formed into a plate-like shape, and is disposed in a stacked state with the liquid crystal panel 20 through the display surface 20a by bonding. An optical axis 32a of the first phase shifter 32 (refer to also FIG. 4) is disposed at an angle of substantially 45 degrees with respect to the light guide axis 21a of the linearly polarizing plate 21 of the liquid crystal panel 20. The optical axis 32a or 37a according to the present embodiment indicates an axis (so-called C-axis) having chromatic dispersion in a crystal composing the phase shifter 32 or 37.

When the display light passes through the first phase shifter 32, a phase difference of substantially ¼ wavelength occurs between a component whose oscillation direction of an electric field is parallel to the optical axis 32a and a component perpendicular to the optical axis 32a. Since the polarization direction of the display light incident on the first phase shifter 32 forms an angle of 45 degrees with respect to the optical axis 32a, the display light is substantially converted from the linear polarized light to the circularly polarized light by applying a phase difference of the ¼ wavelength to the display light by the first phase shifter 32 described above. The display light thus converted into the circularly polarized light by the transmission of the first phase shifter 32 enters the reflecting member 36.

The reflecting member 36 is disposed on the optical path OP closer to the windshield 3 than the first phase shifter 32. The reflecting member 36 is formed by laminating a reflecting mirror 41 and the second phase shifter 37 on each other by bonding.

The reflecting mirror 41 is formed, for example, by evaporating a metal such as aluminum as a reflection light guide surface 42 on a surface of a base material made of synthetic resin, glass or the like. The reflection light guide surface 42 is formed in a smooth planar shape and is provided to guide the display light.

The second phase shifter 37 is specifically a ⅛ wavelength plate formed in a plate-like shape, and is disposed in a stacked state with the reflecting mirror 41 through the reflection light guide surface 42. The optical axis 37a of the second phase shifter 37 (refer to also FIG. 4) is set in accordance with the placement of the linear polarizer 47 to be described later. In other words, a relationship of the placement between the optical axis 32a of the first phase shifter 32 and the optical axis 37a of the second phase shifter 37 is not particularly required, and the optical axes 32a and 37a can be set independently of each other.

In an exposed surface 38, which is a surface of the second phase shifter 37 opposite to the reflection light guide surface 42, there is a refractive index difference between a refractive index of air and a refractive index of crystal of the second phase shifter 37 so that a part of the display light incident on the exposed surface 38 of the second phase shifter 37 can be reflected by the exposed surface 38. However, at an interface between the surface of the second phase shifter 37 on the reflection light guide surface 42 side and the reflection light guide surface 42, a metal reflection is realized by the metal forming the reflection light guide surface 42, with the result that the reflectance is higher. For that reason, most of the display light is transmitted through the exposed surface 38 as the optical path OP, is reflected by the reflection light guide surface 42, and takes an optical path that is emitted from the exposed surface 38, that is, an optical path that reciprocates through the ⅛ wavelength plate.

Therefore, when the display light reciprocates through the second phase shifter 37, a phase difference of substantially ¼ wavelength obtained by adding the ⅛ wavelength and the ⅛ wavelength is given to the display light, and the display light is substantially converted into the linear polarized light whose polarization direction forms an angle of 45 degrees with respect to the optical axis 37a of the second phase shifter 37. In this example, in order to realize the phase difference of the ¼ wavelength, it is more preferable that the incident angle and the reflection angle of the display light to the reflecting member 36 are designed to be as small as possible, or that the second phase shifter 37 is adjusted in consideration of the incident angle and reflection angle. The display light converted into the linear polarized light by the reciprocating motion of the second phase shifter 37 is set to be incident on the magnifying mirror 44.

The magnifying mirror 44 is disposed on the optical path OP closer to the windshield 3 than the first phase shifter 32 and the reflecting member 36. The magnifying mirror 44 is formed, for example, by evaporating a metal such as aluminum as a reflection light guide surface 45 on a surface of a base material made of synthetic resin, glass or the like. The reflection light guide surface 45 is formed into a smooth concave shape by curving a center of the magnifying mirror 44 into a concave shape. The display light incident on the magnifying mirror 44 is reflected toward the linear polarizer 47 by the reflection light guide surface 45.

The magnifying mirror 44 is rotatable around a connecting shaft connected to a stepping motor. With a change in the direction of the reflection light guide surface 45 by the rotation, a position of the virtual image VI can be moved up and down in accordance with a seating height of the occupant or the like.

The linear polarizer 47 is disposed closer to the windshield 3 than the first phase shifter 32, the reflecting member 36, and the magnifying mirror 44 on the optical path OP. The linear polarizer 47 has a property of guiding the light whose polarization direction is along a light guide axis 47a (refer to also FIG. 4) and shielding the light whose polarization direction is along a light shield axis 47b (refer to also FIG. 4).

In particular, in the linear polarizer 47 according to the present embodiment, for example, a film in which iodine is added to polyvinyl alcohol is mainly formed in a sheet shape or a plate shape, and the light guide axis 47a and the light shield axis 47b are formed substantially orthogonal to each other depending on an orientation direction of iodine molecules. In such a linear polarizer 47, the light guide axis 47a is a transmission axis for transmitting the light in the polarization direction corresponding to the light guide axis 47a, and the light shield axis 47b is an absorption axis for absorbing the light in the polarization direction corresponding to the light shield axis 47b.

In addition, the linear polarizer 47 according to the present embodiment is provided so as to shield an entire surface of a light guide window opened in an upper surface portion of the instrument panel 2 and a portion of the housing 50 corresponding to the upper surface portion, to thereby also function as a dustproof cover for preventing dust or the like from entering the housing 50.

The linear polarizer 47 is provided so as to arrange the light guide axis 47a along the polarization direction of the display light which is converted into the linear polarized light by the second phase shifter 37, then reflected by the magnifying mirror 44 and entering the linear polarizer 47. In this example, arranging the light guide axis 47a along the polarization direction means that the direction of the light guide axis 47a and the polarization direction form an angle of less than 45 degrees. In particular, according to the present embodiment, the linear polarizer 47 is provided such that the light guide axis 47a substantially coincides with the polarization direction of the display light. For that reason, much of the display light passes through the linear polarizer 47 and is guided to the windshield 3 side.

In this example, in order to increase the reflectance at the windshield 3, it is preferable that the display light is incident on the windshield 3 with an s-polarized light. For that reason, the light guide axis 47a of the linear polarizer 47 is disposed so that the display light enters the windshield 3 with the s-polarized light. In other words, the direction of the optical axis 37a of the second phase shifter 37 is also naturally determined according to a positional relationship with the windshield 3.

Thus, the display light reaches the windshield 3 through the optical path OP from the projection unit 10 through the first phase shifter 32, the reflecting member 36, the magnifying mirror 44, and the linear polarizer 47. Further, the display light reflected by the windshield 3 reaches the visual recognition region EB, so that the occupant can view the virtual image VI.

Figure 4:
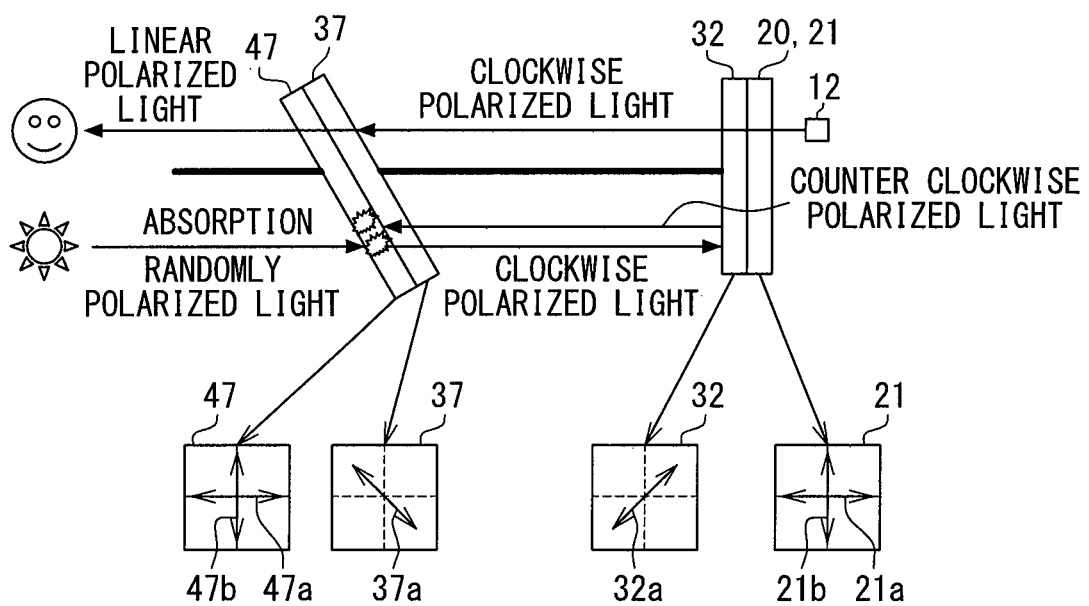
FIG. 4 is a diagram illustrating the behavior of a display light and an ambient light according to the first embodiment.

On the other hand, in the vehicle 1 in which the HUD device 100 is mounted, as also shown in FIG. 4, for example, the ambient light such as sunlight may pass through the windshield 3 from the outside of the vehicle and then enter the interior of the housing 50 through the light guide window 2a. A portion of such ambient light may retrace the optical path OP. The behavior of the ambient light in the light guide unit 30 will be described below.

The ambient light is a randomly polarized light, for example, in the case of sunlight. For that reason, about half of the ambient light incident on the linear polarizer 47 from the windshield 3 side is absorbed by the linear polarizer 47, and the remainder passes through the linear polarizer 47 as the linear polarized light whose polarization direction is along the light guide axis 47a. There is also ambient light reflected by a surface 48 of the linear polarizer 47 on the windshield 3 side, but with the adjustment of the direction of the surface 48, the ambient light can be prevented from being reflected on the windshield 3 to reach the visual recognition region EB.

The ambient light transmitted through the linear polarizer 47 is reflected by the magnifying mirror 44 and can be incident on the reflecting member 36. In the reflecting member 36, similarly to the display light, a light having a wavelength close to the display light among the ambient light is substantially converted into the circularly polarized light by applying a phase difference of the ¼ wavelength by reciprocation of the second phase shifter 37 as the ⅛ wavelength plate.

The ambient light converted into the circularly polarized light by the second phase shifter 37 enters the first phase shifter 32. In this example, the first phase shifter 32 is bonded to the liquid crystal panel 20. An exposed surface 33, which is a surface of the first phase shifter 32 opposite to the liquid crystal panel 20 and faces the windshield 3 side on the optical path OP, has a refractive index difference between a refractive index of air and a refractive index of crystal of the first phase shifter 32. On the other hand, at an interface between the surface of the first phase shifter 32 on the liquid crystal panel 20 side and the display surface 20a of the liquid crystal panel 20, the refractive index difference may be slightly present, but is smaller than the above-mentioned refractive index difference on the exposed surface 33 side. For that reason, the ambient light is mainly reflected by the exposed surface 33 of the first phase shifter 32 on the side opposite to the liquid crystal panel 20. Therefore, the exposed surface 33 functions as a folded reflection surface that reflects the ambient light from the windshield 3 side by folding back to the windshield 3 side in the optical path OP. For that reason, most of the ambient light is reflected by the exposed surface 33 without being given the phase difference by the first phase shifter 32, so that the ambient light becomes the circularly polarized light in opposite directions before and after incidence.

Such an ambient light enters the reflecting member 36 again, and the phase difference of the ¼ wavelength is imparted by the reciprocation of the second phase shifter 37 as the ⅛ wavelength plate. However, since the ambient light is the circularly polarized light in the direction opposite to that in the case where the ambient light is retrograded in the optical path OP, the ambient light is converted into the linear polarized light in the polarization direction substantially orthogonal to that at the time of the first incidence of the second phase shifter 37.

When the ambient light converted into the linear polarized light by the second phase shifter 37 is reflected again by the magnifying mirror 44 and reaches the linear polarizer 47, since the polarization direction of the ambient light is along the light shield axis 47b of the linear polarizer 47, the ambient light is absorbed by the linear polarizer 47. Although the directions of the axes 21a, 21b, 32a, 37a, 47a, and 47b in the optical elements 21, 32, 37, and 47 are exemplified on a lower portion of FIG. 4, the directions are not limited to the directions exemplified in FIG. 4 as long as the axes 21a, 21b, 32a, 37a, 47a, and 47b are set so that the functions in the above description are exhibited.

In addition, since the incident angle of the ambient light to the linear polarizer 47 is different from that of the display light, there may be the ambient light that deviates from the optical path OP of the light guide unit 30. However, such an ambient light is absorbed by providing an absorption function on the inner surface 52 of the housing 50.

In the HUD device of an example, the light guide unit includes an optical lens and a circularly polarizing plate. The optical lens has a reflection surface that is disposed on an optical path and provided so as to be able to reflect a light from the projection member side to the projection member side. The circularly polarizing plate is disposed on the optical path closer to the projection member side than the optical lens, and is configured by putting a ¼ wavelength plate and a linearly polarizing plate together.

In such an HUD device, an ambient light such as a sunlight incident on the light guide unit from the projection member side is converted into a linear polarized light by the linearly polarizing plate, then converted into a circularly polarized light by a ¼ wavelength plate, and further reflected on a reflection surface of the optical lens, resulting in a circularly polarized light opposite to that before reflection. The ambient light of the opposite circularly polarized light is converted into the linear polarized light by the ¼-wavelength plate, and a polarization direction of the linear polarized light is along a light shield axis of the linearly polarizing plate. In other words, since the ambient light is shielded by the linearly polarizing plate, a projection of the ambient light onto the projection member is prevented, and the ambient light is less likely to be reflected in the virtual image.

However, in this HUD device, the display light from the projection unit is transmitted through the optical lens and then converted into the circularly polarized light by the ¼ wavelength plate before entering the linearly polarizing plate. For that reason, about half of the display light is absorbed by the linearly polarizing plate. As a result, it is conceivable that, since a luminance of the virtual image is lowered, the ambient light is less likely to be reflected, but a contrast of the virtual image is not excellent.

The operation and effect of the first embodiment described above will be described below.

According to the first embodiment, the display light projected as the linear polarized light from the projection unit 10 is converted into the circularly polarized light by the first phase shifter 32, and then becomes the linear polarized light again by the second phase shifter 37. Since the linear polarizer 47 is provided so as to arrange the light guide axis 47a along the polarization direction of the display light converted into the linear polarized light by the second phase shifter 37, the display light is guided to the windshield 3 side. Since the display light is projected onto the windshield 3 while reducing the shielding of the display light by the linear polarizer 47 in this manner, a decrease in luminance of the virtual image VI to be displayed is reduced.

On the other hand, about half of the ambient light such as sunlight which can enter the light guide unit 30 from the windshield 3 side is shielded by the linear polarizer 47, and part of the ambient light which is guided to the projection unit 10 side by the linear polarizer 47 becomes a linear polarized light whose polarization direction is along the light guide axis 47a of the linear polarizer 47. When such an ambient light enters the second phase shifter 37, the ambient light is converted into the circularly polarized light by being given the phase difference of the ¼ wavelength from the second phase shifter 37. The ambient light from the windshield 3 side, which has been converted into the circularly polarized light by the second phase shifter 37, is reflected to the windshield 3 side by the exposed surface 33 as the reflection surface of the first phase shifter 32. At this time, since the ambient light becomes the circularly polarized light in the opposite direction to that before reflection, when the ambient light enters the second phase shifter 37 again and is given the phase difference of the ¼ wavelength, the ambient light is converted into the linear polarized light in the polarization direction orthogonal to that at the time of first incidence of the second phase shifter 37. Therefore, when the light enters the linear polarizer 47 again, since the polarization direction of the ambient light is along the light shield axis 47b of the linear polarizer 47, the ambient light is shielded by the linear polarizer 47.

As a result, when the ambient light enters the light guide unit 30 once, the ambient light is less likely to be guided to the windshield 3 side from the linear polarizer 47, so that the projection of the ambient light onto the windshield 3 is reduced and the ambient light is hardly reflected on the virtual image VI. Therefore, it is possible to provide the HUD device 100 that is excellent in the visibility of a virtual image VI by increasing a contrast of the virtual image VI while reducing a decrease in luminance of the virtual image VI due to a display light and reducing the reflection of a background light on the virtual image VI at the same time.

Further, according to the first embodiment, the second phase shifter 37 is a ⅛ wavelength plate disposed in a stacked state with the reflecting mirror 41 through the reflection light guide surface 42. According to such stacking, it is possible to impart the phase difference of the ¼ wavelength to the display light and the ambient light by reciprocating in the second phase shifter 37 at the time of reflection on the reflection light guide surface 42. Therefore, it is possible to improve the contrast of the virtual image VI while reducing an increase in the number of parts.

According to the first embodiment, the first phase shifter 32 is the ¼ wavelength plate disposed in the stacked state with the liquid crystal panel 20 through the display surface 20a. According to such bonding, the difference in refractive index at the interface between the first phase shifter 32 and the liquid crystal panel 20 can be made smaller than the difference in refractive index at the exposed surface 33 serving as the reflection surface facing the windshield 3 side. For that reason, the reflection at the interface is reduced, and a proportion of the light reflected by the exposed surface 33 and shielded by the linear polarizer 47 to the ambient light can be surely increased, and the effect of reducing the projection of the ambient light onto the windshield 3 is enhanced.

According to the first embodiment, the light guide axis 47a coincides with the polarization direction of the display light, which has been converted into the linear polarized light by the second phase shifter 37. For that reason, most of the display light can be transmitted through the linear polarizer 47, so that the decrease in luminance of the virtual image VI can be reduced more reliably.

Second Embodiment

Figure 5:
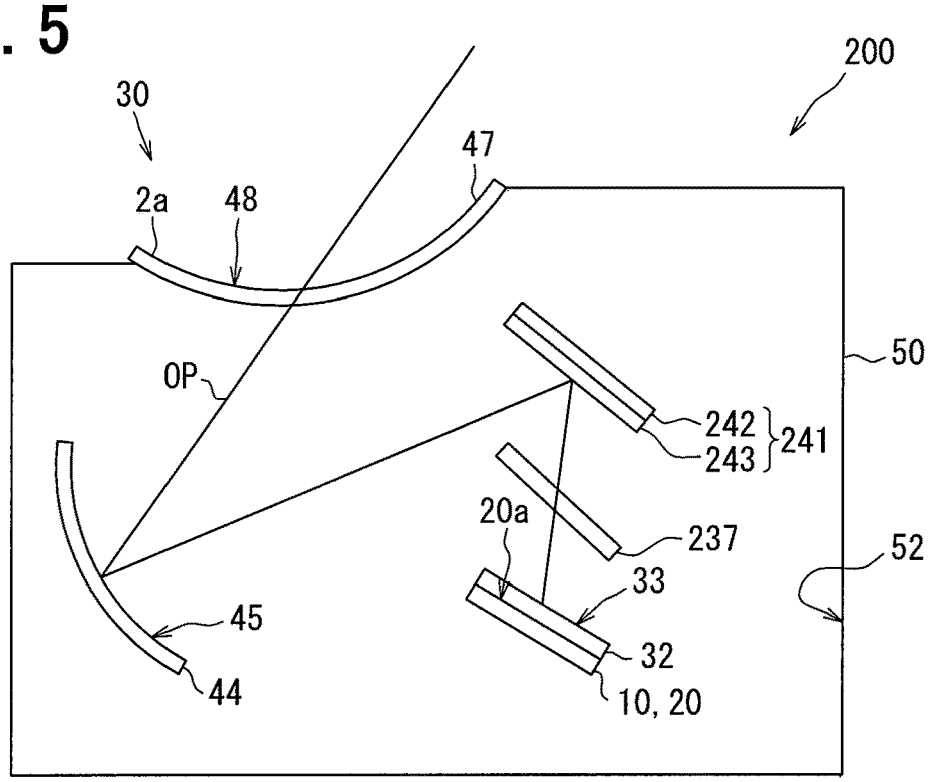
FIG. 5 is a diagram showing a schematic configuration of an HUD device according to a second embodiment.

As shown in FIG. 5, a second embodiment is a modification of the first embodiment. The second embodiment will be described focusing on points different from the first embodiment.

A light guide unit 230 in an HUD device 200 according to the second embodiment includes a first phase shifter 32, a second phase shifter 237, a multilayer film reflecting mirror 241, a magnifying mirror 44, and a linear polarizer 47. The first phase shifter 32, the magnifying mirror 44, and the linear polarizer 47 are the same as those in the first embodiment.

The second phase shifter 237 is disposed on the optical path OP closer to the windshield 3 than the first phase shifter 32, in particular, between the first phase shifter 32 and the multilayer film reflecting mirror 241. Specifically, the second phase shifter 237 is a ¼ wavelength plate formed in the form of a plate-like shape. The optical axis 37a of the second phase shifter 237 is set in accordance with the placement of the linear polarizer 47, and further set in accordance with the placement of the multilayer film reflecting mirror 241, as in the first embodiment.

When a display light converted into a circularly polarized light by the first phase shifter 32 passes through the second phase shifter 237, the display light is substantially converted from the circularly polarized light to the linear polarized light by applying a phase difference of ¼ wavelength to the display light by the second phase shifter 237. The display light thus converted into the linear polarized light enters the multilayer film reflecting mirror 241.

The multilayer film reflecting mirror 241 is disposed on the optical path OP closer to the windshield 3 than the first phase shifter 32 and the second phase shifter 237. The multilayer film reflecting mirror 241 is a reflecting mirror that guides a display light by reflection on an optical multilayer film 243. Specifically, the multilayer film reflecting mirror 241 is provided by stacking the optical multilayer film 243 on a surface of a light transmissive substrate 242 on which the display light is incident.

The light transmissive substrate 242 is made of, for example, synthetic resin or glass in a plate-like shape having translucency with respect to a large number of wavelengths in a visible light region, an infrared region, and an ultraviolet region.

The optical multilayer film 243 is formed by stacking two or more kinds of thin films made of optical materials having different refractive indices on each other. As the thin film, a dielectric thin film or a metallic thin film can be employed, and for example, titanium oxide ($TiO_2$), silicon oxide ($SiO_2$), or the like can be employed.

The film thickness of each thin film is appropriately set by, for example, optimization calculation by a computer under condition setting based on a desired optical performance. In particular, in the optical multilayer film 243 according to the present embodiment, the optical performance in which the reflectance for wavelengths in the infrared region and the ultraviolet region is low with respect to the reflectance for wavelengths in the visible light region is realized. With the optical performance described above, the multilayer film reflecting mirror 241 functions as a cold mirror that transmits an infrared light and an ultraviolet light out of the ambient light that retrogrades in the optical path OP and excludes the infrared light and the ultraviolet light out of the optical path OP while certainly reflecting the display light that contributes to the visual recognition of the virtual image VI. The excluded infrared light and ultraviolet light are absorbed by, for example, the inner surface 52 of the housing 50.

The display light thus converted into the linear polarized light by the second phase shifter 237 enters the multilayer film reflecting mirror 241 with the s-polarized light, and is reflected by the optical multilayer film 243. In general, when light is incident obliquely in the stacking direction of the optical multilayer film 243, there may occur various problems such as a phase disturbance between the s-polarized component and a p-polarized component, for example, discoloration of the virtual image VI. However, according to the present embodiment, the second phase shifter 237 is disposed between the first phase shifter 32 and the multilayer film reflecting mirror 241 on the optical path OP, and the display light is made incident on the multilayer film reflecting mirror 241 with the s-polarized light, thereby avoiding the above problems.

As in the first embodiment, the linear polarizer 47 is provided so as to arrange the light guide axis 47a along the polarization direction of the display light which is converted into the linear polarized light by the second phase shifter 237, then reflected by the multilayer film reflecting mirror 241 and the magnifying mirror 44 and entering the linear polarizer 47.

As in the first embodiment, the ambient light can also enter the inside of the HUD device 100 of the second embodiment. The ambient light transmitted through the linear polarizer 47 is reflected by the magnifying mirror 44 and can be incident on the multilayer film reflecting mirror 241. In this case, although the infrared light and the ultraviolet light are described above, a visible light is reflected by the multilayer film reflecting mirror 241 and enters the second phase shifter 237 as the linear polarized light. The display light of the linear polarized light is substantially converted into the circularly polarized light by applying a phase difference of the ¼ wavelength by the transmission of the second phase shifter 237.

The ambient light converted into the circularly polarized light by the second phase shifter 237 is incident on the first phase shifter 32, but in many cases, as in the first embodiment, the ambient light is reflected on the exposed surface 33, so that no phase difference is given by the first phase shifter 32, and the circularly polarized light is polarized in the directions opposite to each other before and after the incidence.

Such ambient light is given the phase difference of ¼ wavelength by the transmission of the second phase shifter 237 again. However, since the ambient light is the circularly polarized light in the opposite direction to that in the case of retrograding in the optical path OP, the ambient light is converted into the linear polarized light in a polarization direction orthogonal to that at the time of first incidence of the second phase shifter 237.

When the ambient light converted into the linear polarized light by the second phase shifter 237 is reflected again by the multilayer film reflecting mirror 241 and the magnifying mirror 44 and reaches the linear polarizer 47, since the polarization direction of the ambient light is along the light shield axis 47b of the linear polarizer 47, the ambient light is absorbed by the linear polarizer 47.

When the second phase shifter 237 is inclined with respect to the optical axis as in the present embodiment, when the ambient light enters the second phase shifter 237, a part of the ambient light is reflected by the surface of the second phase shifter 237 and is excluded from the optical path OP. The ambient light excluded from the optical path OP is absorbed by, for example, the inner surface 52 of the housing 50.

According to the second embodiment described above, the second phase shifter 237 is a ¼ wavelength plate provided so as to be able to transmit the display light. With the placement of the second phase shifter 237 on the optical path OP, the phase difference of the ¼ wavelength can be reliably given to the display light and the ambient light.

According to the second embodiment, the second phase shifter 237 is disposed between the first phase shifter 32 and the multilayer film reflecting mirror 241. In the placement described above, since the display light is converted into the linear polarized light by the second phase shifter 237 and then enters the optical multilayer film 243, it is possible to reduce a situation in which the phase is disturbed when the display light is reflected by the optical multilayer film 243. Therefore, the visibility of the virtual image VI becomes excellent.

Although the multiple embodiments have been described above, the present disclosure is not construed as being limited to these embodiments, and can be applied to various embodiments and combinations within a scope that does not depart from the spirit of the present disclosure. Modifications of the above embodiments will be described.

Figure 6:
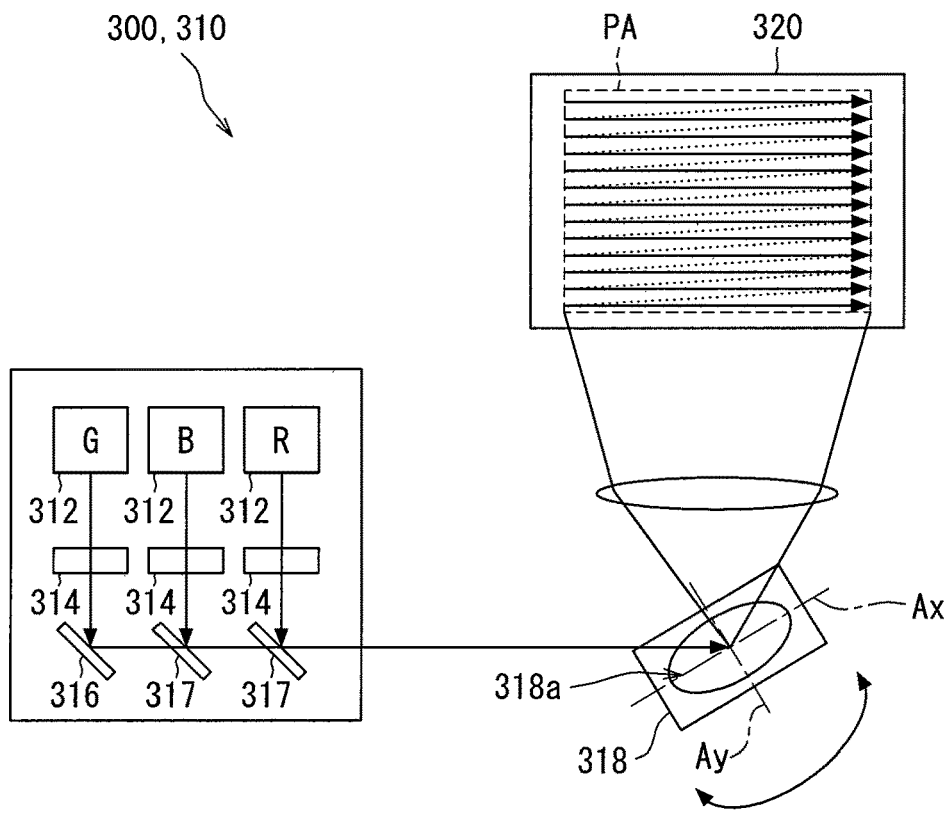
FIG. 6 is a diagram showing a projection unit according to Modification 1.

Specifically, as Modification 1, a projection unit 310 other than the configuration using the liquid crystal panel 20 can be employed. For example, as shown in FIG. 6, the projection unit 310 may project the display light of an image as the linear polarized light by drawing the laser light beam on the screen 320 in a scanning manner. The projection unit 310 includes multiple laser oscillators 312, multiple collimating lenses 314, a folding mirror 316, multiple dichroic mirrors 317, a scanning mirror 318, and a screen 320.

The three laser oscillators 312 emit laser light beams having different wavelengths. As the laser oscillators 312, for example, diode lasers are employed, thereby being capable of oscillating the linearly polarized laser light beams. The laser light beams of the respective colors oscillated from the respective laser oscillators 312 pass through the respective collimating lens 314, and are superimposed on each other by the folding mirror 316 and the dichroic mirrors 317.

The superimposed laser light beam enters the scanning mirror 318. A reflection surface 318a of the scanning mirror 318 is rotatable about two rotation axes Ax and Ay substantially orthogonal to each other. The reflection surface 318a reflects the laser light beam while changing a direction of the reflection surface 318a, thereby making it possible to draw an image in a projection region PA on the screen 320.

Figure 7:
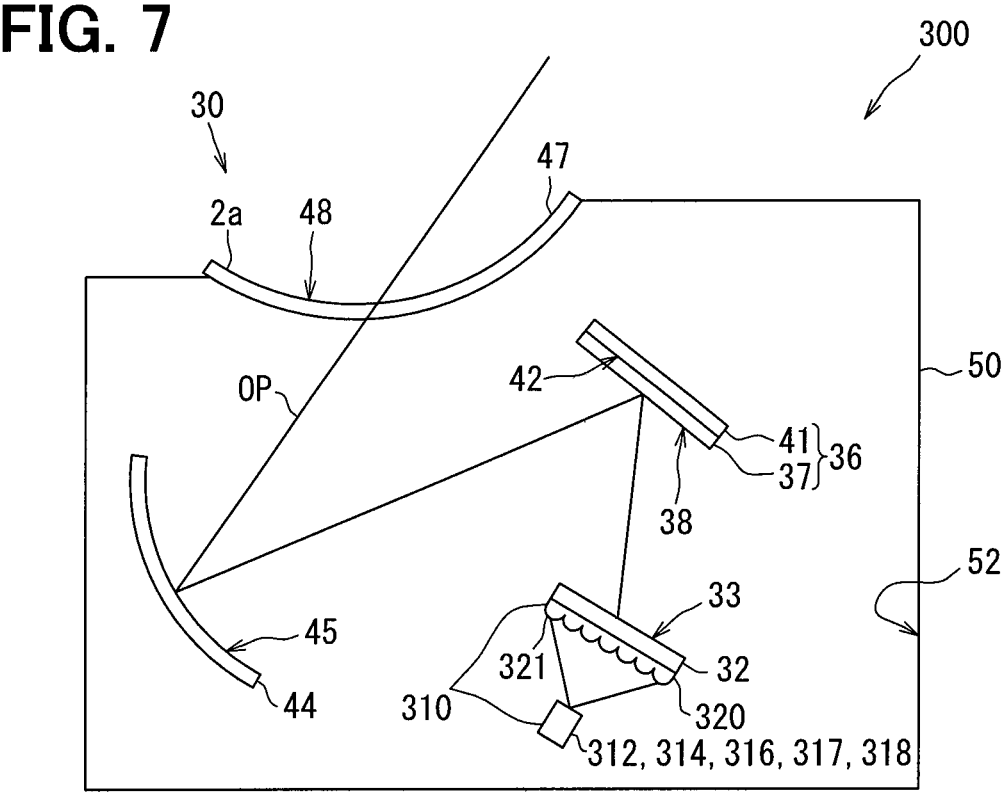
FIG. 7 is a diagram showing a schematic configuration of an HUD device in one example of Modification 1.

In this example, as shown in the HUD device 300 of FIG. 7, the screen 320 is a transmissive screen, and is formed in a lens array shape capable of transmitting the laser light beam. A refractive element 321 having a convex or concave curved surface is disposed in a lattice pattern on a surface of the screen 320 on the incident side of the laser light beam. The laser light beam is refracted by the refractive element 321 so that a spot diameter of the laser light beam is enlarged after the emission of the screen 320.

For such a projection unit 310, the first phase shifter 32 is a ¼ wavelength plate formed in a plate-like shape and is disposed in a stacked state with the screen 320 through an exit surface of the screen 320 by bonding. Even with such a configuration, it is possible to achieve the operation and effect according to the first embodiment and the second embodiment.

Figure 8:
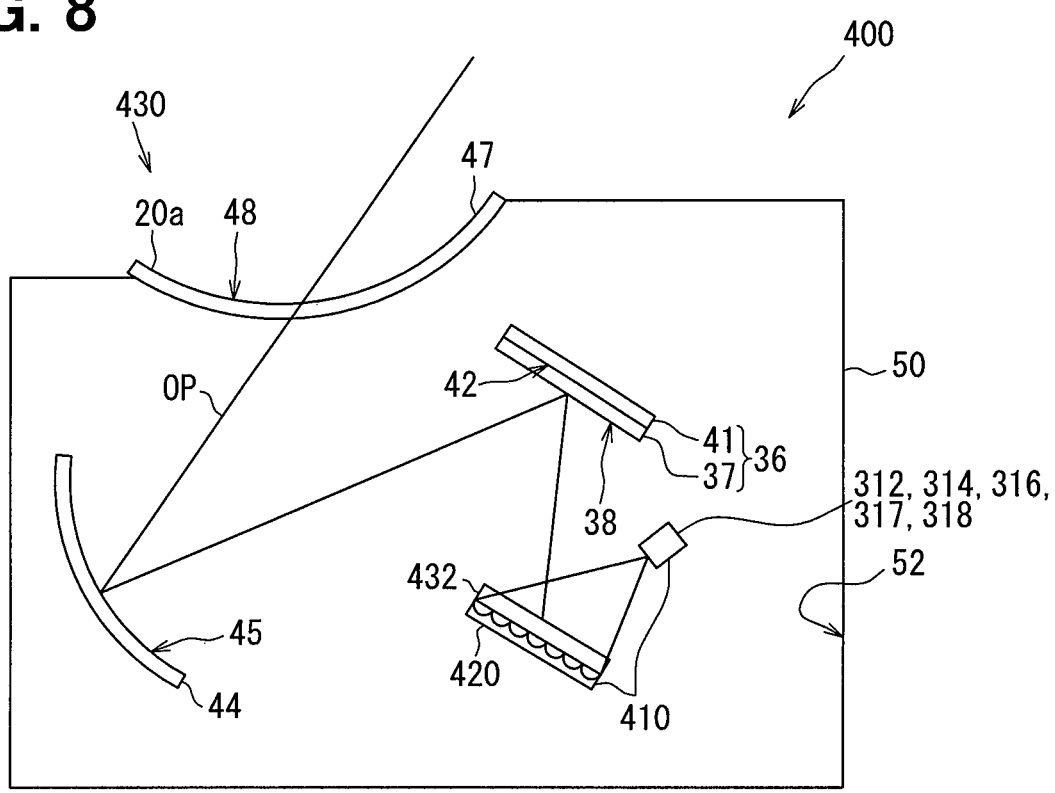
FIG. 8 is a diagram showing a schematic configuration of an HUD device according to another example of Modification 1.

Further, as shown in an HUD device 400 of FIG. 8, a screen 420 of a projection unit 410 may be changed to a reflection type with respect to the projection unit 310. In that case, a ⅛ wavelength plate is employed as a first phase shifter 432 of a light guide unit 430. In other words, the laser light beam can be converted from the linear polarized light into the circularly polarized light by causing the laser light beam to reciprocate the first phase shifter 432 before and after reflection of the laser light beam on the screen 420.

In Modification 2, the linear polarizer 47 is not limited to the placement to close the light guide window 2a. For example, the linear polarizer 47 may be disposed between the reflecting member 36 and the magnifying mirror 44 on the optical path OP of the first embodiment. Further, for example, the linear polarizer 47 may be disposed between the second phase shifter 237 and the multilayer film reflecting mirror 241 on the optical path OP of the second embodiment. In that case, the second phase shifter 237 and the linear polarizer 47 may be disposed in a stacked state.

As Modification 3 relating to the first embodiment, a configuration may be employed in which the second phase shifter 37 of the ⅛ wavelength plate is provided in a stacked state with the magnifying mirror 44 through the reflection light guide surface 45 without providing the reflecting member 36.

As Modification 4 relating to the second embodiment, a configuration may be adopted in which the display light converted into the linear polarized light by the second phase shifter 37 is incident on the multilayer film reflecting mirror 241 in the p-polarized light.

In Modification 5 relating to the second embodiment, the multilayer film reflecting mirror 241 may be replaced with the reflecting mirror 41 similar to that of the first embodiment.

As Modification 6, the present disclosure may be applied to various types of moving objects (transport equipment) such as ships or airplanes other than the vehicle 1.

The head-up display device 100, 200, 300, 400 illustrated above is mounted on a moving object 1 for projecting an image onto a projection member 3 to display the image as a virtual image VI visually recognizable by an occupant. The head-up display device 100, 200, 300, 400 includes a projection unit 10, 310 that projects a display light of the image as a linear polarized light, and a light guide unit 30, 230, 430 that provides an optical path OP through which to guide the display light to the projection member 3. The light guide unit 30, 230, 430 includes a first phase shifter 32, 432 that is disposed on the optical path OP to convert the display light as the linear polarized light from the projection unit 10, 310 into a circularly polarized light and that includes a reflection surface 33, which is provided to be directed to the projection member 3 and to be capable of reflecting a light from the projection member 3 side to the projection member 3 side, a second phase shifter 37, 237 that is disposed on the projection member 3 side of the first phase shifter 32, 432 on the optical path OP and gives a phase difference of a ¼ wavelength to the display light converted into the circularly polarized light by the first phase shifter 32, 432 to convert the display light into a linear polarized light, and a linear polarizer 47 that is disposed on the projection member 3 side of the second phase shifter 37, 237 on the optical path OP to guide a light whose polarization direction is along a light guide axis 47a and to shield a light whose polarization direction is along a light shield axis 47b perpendicular to the light guide axis 47a. The linear polarizer 47 is provided to arrange the light guide axis 47a along a polarization direction of the display light converted into the linear polarized light by the second phase shifter 37, 237 to guide the display light toward the projection member 3.

In this aspect, the display light projected as the linear polarized light from the projection unit 10, 310 is converted into the circularly polarized light by the first phase shifter 32, 432, and then converted into the linear polarized light again by the second phase shifter 37, 237. Since the linear polarizer 47 is provided with a light guide axis 47a aligned with a polarization direction of the display light converted into the linear polarized light by the second phase shifter 37, 237, the display light is guided to the projection member 3 side. Since the display light is projected onto the projection member 3 while reducing the shielding of the display light by the linear polarizer 47 in this manner, a decrease in luminance of the virtual image VI to be displayed is reduced.

On the other hand, about half of the ambient light such as sunlight which can enter the light guide unit 30, 230, 430 from the projection member 3 side is shielded by the linear polarizer 47, and part of the ambient light which is guided to the projection unit 10, 310 side by the linear polarizer 47 becomes a linear polarized light whose polarization direction is along the light guide axis 47a of the linear polarizer 47. When such ambient light enters the second phase shifter 37, 237, the light having a wavelength close to the display light among the ambient light is converted into a circularly polarized light by being given a phase difference of a ¼ wavelength from the second phase shifter 37, 237. The ambient light from the projection member 3 side, which has been converted into the circularly polarized light by the second phase shifter 37, 237, is reflected to the projection member 3 side by a reflection surface 33 of the first phase shifter 32, 432. At that time, since the ambient light becomes the circularly polarized light in the opposite direction to that before reflection, when the ambient light enters the second phase shifter 37, 237 again and is given a phase difference of the ¼ wavelength, the ambient light is converted into the linear polarized light in a polarization direction orthogonal to that at the time of first incidence of the second phase shifter 37, 237. Therefore, when the light enters the linear polarizer 47 again, since the polarization direction of the ambient light is along the light shielding axis 47b of the linear polarizer 47, the ambient light is shielded by the linear polarizer 47.

As a result, when the ambient light enters the light guide unit 30, 230, 430 once, since the ambient light is less likely to be guided from the linear polarizer 47 to the projection member 3 side, the projection of the ambient light onto the projection member 3 is reduced, which makes it difficult to reflect the ambient light into the virtual image VI. Therefore, it is possible to provide an HUD device 100, 200, 300, 400 that is excellent in the visibility of a virtual image VI by increasing a contrast of the virtual image VI while reducing a decrease in luminance of the virtual image VI due to a display light and reducing the reflection of a background light on the virtual image VI at the same time.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. A head-up display device mounted on a moving object for projecting an image onto a projection member to display the image as a virtual image visually recognizable by an occupant, the head-up display device comprising:
 a projection unit configured to project a display light of the image as a linear polarized light; and
 a light guide unit configured to provide an optical path through which to guide the display light to the projection member, wherein the light guide unit includes:
  a first phase shifter that is disposed on the optical path to convert the display light as the linear polarized light from the projection unit into a circularly polarized light and that includes a reflection surface, which is provided to be directed to the projection member and to be capable of reflecting a light from the projection member side to the projection member side;
  a second phase shifter that is disposed on the projection member side of the first phase shifter on the optical path and is configured to give a phase difference of a ¼ wavelength to the display light converted into the circularly polarized light by the first phase shifter to convert the display light into a linear polarized light; and
  a linear polarizer that is disposed on the projection member side of the second phase shifter on the optical path to guide a light whose polarization direction is along a light guide axis and to shield a light whose polarization direction is along a light shield axis perpendicular to the light guide axis, wherein the linear polarizer is provided to arrange the light guide axis along a polarization direction of the display light converted into the linear polarized light by the second phase shifter to guide the display light toward the projection member, wherein:

the light guide unit further includes a reflecting mirror configured to guide the display light by its reflection on a reflection light guide surface; and the second phase shifter is a ⅛ wavelength plate disposed to be stacked on the reflecting mirror via the reflection light guide surface.

2. The head-up display device according to claim 1, wherein:

the projection unit includes a liquid crystal panel provided with a display surface that emits the display light; and the first phase shifter is a ¼ wavelength plate disposed to be stacked on the liquid crystal panel via the display surface.

3. The head-up display device according to claim 1, wherein the light guide axis coincides with the polarization direction of the display light converted into the linear polarized light by the second phase shifter.

4. A head-up display device mounted on a moving object for projecting an image onto a projection member to display the image as a virtual image visually recognizable by an occupant, the head-up display device comprising:

a projection unit configured to project a display light of the image as a linear polarized light; and a light guide unit configured to provide an optical path through which to guide the display light to the projection member, wherein the light guide unit includes:

a first phase shifter that is disposed on the optical path to convert the display light as the linear polarized light from the projection unit into a circularly polarized light and that includes a reflection surface, which is provided to be directed to the projection member and to be capable of reflecting a light from the projection member side to the projection member side;

a second phase shifter that is disposed on the projection member side of the first phase shifter on the optical path and is configured to give a phase difference of a ¼ wavelength to the display light converted into the circularly polarized light by the first phase shifter to convert the display light into a linear polarized light; and a linear polarizer that is disposed on the projection member side of the second phase shifter on the optical path to guide a light whose polarization direction is along a light guide axis and to shield a light whose polarization direction is along a light shield axis perpendicular to the light guide axis, wherein the linear polarizer is provided to arrange the light guide axis along a polarization direction of the display light converted into the linear polarized light by the second phase shifter to guide the display light toward the projection member, wherein:

the light guide unit further includes a multilayer film reflecting mirror configured to guide the display light by its reflection on an optical multilayer film on the optical path; and the second phase shifter is a ¼ wavelength plate provided to be capable of transmitting the display light and is disposed between the first phase shifter and the multilayer film reflecting mirror.

5. The head-up display device according to claim 4, wherein:

the projection unit includes a liquid crystal panel provided with a display surface that emits the display light; and the first phase shifter is a ¼ wavelength plate disposed to be stacked on the liquid crystal panel via the display surface.

6. The head-up display device according to claim 4, wherein the light guide axis coincides with the polarization direction of the display light converted into the linear polarized light by the second phase shifter.

7. A head-up display device mounted on a moving object for projecting an image onto a projection member to display the image as a virtual image visually recognizable by an occupant, the head-up display device comprising:

a light source configured to project a display light of the image as a linear polarized light; and a light guide unit configured to provide an optical path through which to guide the display light to the projection member, wherein the light guide unit includes:

a ¼ wavelength plate that is disposed on the optical path to convert the display light as the linear polarized light from the light source into a circularly polarized light and that includes a reflection surface, which is provided to be directed to the projection member and to be capable of reflecting a light from the projection member side to the projection member side;

a ⅛ wavelength plate that is disposed on the projection member side of the ¼ wavelength plate on the optical path and is configured to give a phase difference of a ¼ wavelength to the display light converted into the circularly polarized light by the ¼ wavelength plate to convert the display light into a linear polarized light; and a linear polarizer that is disposed on the projection member side of the ⅛ wavelength plate on the optical path to guide a light whose polarization direction is along a light guide axis and to shield a light whose polarization direction is along a light shield axis perpendicular to the light guide axis, wherein the linear polarizer is provided to arrange the light guide axis along a polarization direction of the display light converted into the linear polarized light by the ⅛ wavelength plate to guide the display light toward the projection member.

* * * * *